US011023215B2

(12) United States Patent
Biskup et al.

(10) Patent No.: US 11,023,215 B2
(45) Date of Patent: *Jun. 1, 2021

(54) METHODS, SYSTEMS, AND PORTAL FOR ACCELERATING ASPECTS OF DATA ANALYTICS APPLICATION DEVELOPMENT AND DEPLOYMENT

(71) Applicant: AON GLOBAL OPERATIONS LTD (SINGAPORE BRANCH), Singapore (SG)

(72) Inventors: Bernhard Biskup, Lohmar (DE); Mark Carey, Galway (IE); Simon Lewis, Dublin (IE); Stephen Kernan, Dublin (IE)

(73) Assignee: AON GLOBAL OPERATIONS SE, SINGAPORE BRANCH, Singapore (SG)

( * ) Notice: Subject to any disclaimer, the term of this patent is extended or adjusted under 35 U.S.C. 154(b) by 0 days.

This patent is subject to a terminal disclaimer.

(21) Appl. No.: 16/705,448

(22) Filed: Dec. 6, 2019

(65) Prior Publication Data
US 2020/0117434 A1    Apr. 16, 2020

Related U.S. Application Data

(63) Continuation-in-part of application No. 15/846,707, filed on Dec. 19, 2017, now Pat. No. 10,572,226.
(Continued)

(51) Int. Cl.
*G06F 8/60* (2018.01)
*G06F 8/71* (2018.01)
(Continued)

(52) U.S. Cl.
CPC .................. *G06F 8/60* (2013.01); *G06F 8/36* (2013.01); *G06F 8/71* (2013.01); *G06F 9/445* (2013.01); *G06F 11/3688* (2013.01)

(58) Field of Classification Search
CPC ..... G06F 8/36; G06F 8/60; G06F 8/71; G06F 9/445; G06F 11/3688
(Continued)

(56) References Cited

U.S. PATENT DOCUMENTS 8,990,920 B2   3/2015   Pontillo et al.
9,256,467 B1   2/2016   Singh et al.
(Continued)

FOREIGN PATENT DOCUMENTS

| CN | 110622129 | 12/2019 |
|---|---|---|
| EP | 3559801 | 10/2019 |
| WO | 2018117966 | 6/2018 |

OTHER PUBLICATIONS

Partial European Search Report issued in European Application No. 17835721.6 dated Nov. 13, 2020, 9 pages.
(Continued)

*Primary Examiner* — Chat C Do
*Assistant Examiner* — Bradford F Wheaton
(74) *Attorney, Agent, or Firm* — Gardella Grace P.A.

(57) ABSTRACT

The present disclosure relates to methods and systems for accelerating the development and distribution of data science workloads, including a consistent, portable and pre-configured data science workspace for development of data science applications allowing for the creation of a standardized, modular and reusable library of data science code product that can be maintained, extended and reused in a clear and repeatable manner. The code may be submitted to a build and deployment process that ensures consistency across multiple environments in terms of the application code and the operating system environment. Runtime execution may be managed through the authoring of definitions which detail aspects of how the workload should operate within a certain environment.

21 Claims, 8 Drawing Sheets

Related U.S. Application Data

(60) Provisional application No. 62/437,538, filed on Dec. 21, 2016.

(51) Int. Cl.
    *G06F 9/445*     (2018.01)
    *G06F 11/36*     (2006.01)
    *G06F 8/36*     (2018.01)

(58) Field of Classification Search
    USPC ........................................................ 717/101
    See application file for complete search history.

(56) References Cited

U.S. PATENT DOCUMENTS

| | | | |
|---|---|---|---|
| 9,367,305 | B1 | 6/2016 | Kumar et al. |
| 9,710,261 | B2 * | 7/2017 | Frankin ................. G06F 8/71 |
| 10,154,065 | B1 * | 12/2018 | Buchler .............. G06F 21/6218 |
| 10,572,226 | B2 | 2/2020 | Biskup et al. |
| 2005/0138557 | A1 | 6/2005 | Bolder et al. |
| 2006/0070034 | A1 | 3/2006 | Balfe et al. |
| 2011/0296425 | A1 | 12/2011 | Fukuda et al. |
| 2014/0222957 | A1 | 8/2014 | Gangadharan et al. |
| 2015/0269694 | A1 * | 9/2015 | Boudreau .......... G06Q 30/0603 |
| | | | 705/310 |
| 2016/0070565 | A1 | 3/2016 | Kaneki et al. |
| 2016/0104002 | A1 | 4/2016 | Schneider et al. |
| 2016/0124742 | A1 | 5/2016 | Rangasamy et al. |
| 2017/0039038 | A1 | 2/2017 | Huber et al. |
| 2017/0099362 | A1 * | 4/2017 | Almond .................. H04L 67/26 |
| 2017/0180346 | A1 | 6/2017 | Suarez et al. |
| 2017/0185627 | A1 * | 6/2017 | Reynolds .................. G06F 8/65 |
| 2017/0357485 | A1 | 12/2017 | Rees et al. |
| 2018/0173502 | A1 | 6/2018 | Biskup et al. |

OTHER PUBLICATIONS

Git, Wikipedia, Oct. 26, 2016, XP055744803, Retrieved at: URL:https://web.archive.org/web/20161026071435/https://en.wikipedia.org/wiki/git, 13 pages.

Office Action issued in Chinese Application No. 201780085086.4 dated Jun. 22, 2020 (with translation).

Examination Report issued in European application No. 17835721.6 dated Dec. 18, 2020, 14 pages.

International Search Report and Written Opinion issued in International Application No. PCT/SG2017/050632 dated May 30, 2018.

International Preliminary Report on Patentability issued in International Application No. PCT/SG2017/050632 dated Jun. 25, 2019.

Non-Final Office Action issued in U.S. Appl. No. 15/846,707 dated Jan. 11, 2019.

Notice of Allowance issued in U.S. Appl. No. 15/846,707 dated Jul. 3, 2019.

Notice of Allowance issued in U.S. Appl. No. 15/846,707 dated Sep. 3, 2019.

* cited by examiner

METHODS, SYSTEMS, AND PORTAL FOR ACCELERATING ASPECTS OF DATA ANALYTICS APPLICATION DEVELOPMENT AND DEPLOYMENT

RELATED APPLICATIONS

This application is a continuation-in-part of and claims priority to U.S. patent application Ser. No. 15/846,707 entitled "Methods, Systems, and Portal Using Software Containers for Accelerating Aspects of Data Analytics Application Development and Deployment," filed Dec. 19, 2017 which claims priority to U.S. Provisional Patent Application Ser. No. 62/437,538, entitled "Methods, Systems, and Portal Using Software Containers for Accelerating Aspects of Data Analytics Application Development and Deployment," filed Dec. 21, 2016. Each above identified application is hereby incorporated by reference in its entirety.

BACKGROUND

The industry around Data Science is continuously growing as new potential is identified in the data that organizations collect and maintain. Historically, Data Scientists have explored new tools and techniques for mining value from data on an experimental basis. Only after experimental proof of concept in the value of the data will organizations typically invest in the restructuring and support of the new tools and techniques. Unfortunately, because re-structuring or amending a functional data ecosystem is daunting, often the newly developed Data Science workload is instead hosted by an internal Information Technology department in a fragmented, customized, and tacked-on manner, for example through a dedicated server. These specialized solutions and dedicated resources increase technical costs and reduce opportunities for resource sharing and algorithm reuse.

The inventors recognized the need to build a flexible Data Science development and distribution mechanism into the backbone of an organization's data solutions architecture to increase analytics experimentation and streamline the experimentation process. The need for flexibility includes flexible support for software dependencies across disparate audiences which historically lead to provisioning of specially configured and dedicated hardware.

SUMMARY OF ILLUSTRATIVE EMBODIMENTS

Software containers solve the problem of getting software to run reliably regardless of the underlying computing environment. For example, software containers support portability from one computing environment to another computing environment, such as from a development environment, to a testing environment, and finally to a production environment. In some examples, the environments can range from a standalone computer (e.g., laptop, etc.) to a virtual machine executing in a private or public cloud computing environment.

The software container includes an entire runtime environment required by the software application to execute, bundled together. In addition to the software application, its runtime environment can include all its dependencies, libraries and other binaries. The runtime environment further may include configuration files needed to run the software application. By including the application platform and its dependencies within the software container, differences in underlying execution environment operating system and/or other underlying infrastructure are abstracted away.

The underlying computing environment, however, still runs a single operating system, and each container shares the operating system kernel with any other containers. Shared parts of the operating system are read only, such that individual software containers cannot interfere with the functionality of other software containers. Each software container has its own dedicated access mount for writing to the computing environment. This allows software to be more lightweight and use far fewer resources than virtual machines The inventors determined that applying software container technology to produce Data Science experimental instances would allow organizations to isolate experimental efforts while simultaneously providing a development platform integral to the organization's data ecosystem. Additionally, execution of the isolated experiments may be automated through a microservice intake and deployment pipeline, coordinating hardware provisioning and streamlining execution. Further, the isolated instances may be load balanced to avoid conflict with active analytics performance within the data ecosystem.

The forgoing general description of the illustrative implementations and the following detailed description thereof are merely exemplary aspects of the teachings of this disclosure, and are not restrictive.

BRIEF DESCRIPTION OF THE DRAWINGS

The accompanying drawings, which are incorporated in and constitute a part of the specification, illustrate one or more embodiments and, together with the description, explain these embodiments. The accompanying drawings have not necessarily been drawn to scale. Any values dimensions illustrated in the accompanying graphs and figures are for illustration purposes only and may or may not represent actual or preferred values or dimensions. Where applicable, some or all features may not be illustrated to assist in the description of underlying features. In the drawings.

DETAILED DESCRIPTION OF ILLUSTRATIVE EMBODIMENTS

The description set forth below in connection with the appended drawings is intended to be a description of various, illustrative embodiments of the disclosed subject matter. Specific features and functionalities are described in connection with each illustrative embodiment; however, it will be apparent to those skilled in the art that the disclosed embodiments may be practiced without each of those specific features and functionalities.

Figure 1A:
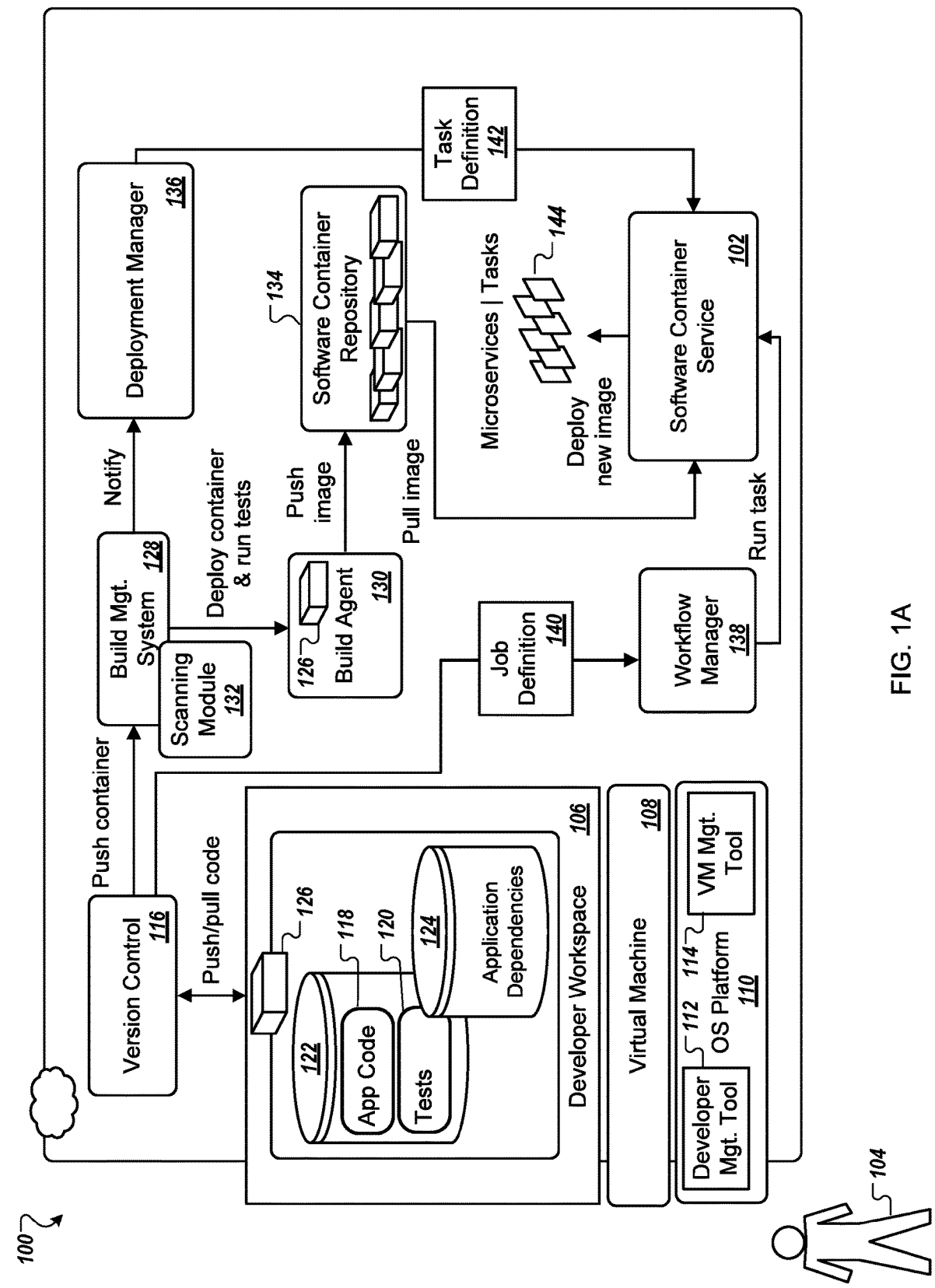
FIG. 1A is a block diagram of an example development ecosystem for the delivery of analytics workloads to a cloud analytics environment to act as self-contained microservices.

FIG. 1A illustrates an example development ecosystem 100 for the delivery of analytics workloads (software executables) to a cloud analytics environment to act as self-contained microservices. A microservice is an independently deployable software enabled service, capable of automated deployment and intelligence in endpoint communications.

The development ecosystem 100 utilizes a software container service 102. The software container service 102 performs a variety of functions on behalf of the software container images executing within the cloud analytics environment, such as building software containers, running containers as executing software images, uploading and downloading software containers, scheduling software container image execution, and load balancing software container image deployment. The software container service 102 executes on top of the host environment operating system, isolating write spaces and enabling software container image communications with the host environment operating system.

In some implementations, each data science developer 104 interfacing with the development ecosystem 100 is provided a containerized developer workspace 106 for developing applications and test scripts for running the applications. Developers 104 working within the containerized developer workspace 106 develop software containers (e.g., a filesystem and parameters to use at runtime) for execution as a software image at runtime.

In particular, the containerized developer workspace may be provided in a Virtual Machine (VM) environment 108 launched on a common computing operating system platform 110, such as a Windows® platform (by Microsoft Corporation of Redmond, Wash.). Virtual machine environments emulate computing systems. They can provide the functionality needed to execute an entire operating system. A hypervisor uses native operating system execution (e.g., the underlying OS configuration of the computing system running the VM) to manage sharing of computing system resources, such as hardware resources, allowing for multiple isolated VM environments to exist on the same physical machine without awareness of each other.

The VM environment 108 can be launched using a developer management tool 112 to manage the developer environment. The developer management tool 112, for example, provides a tool for building and maintain portable virtual development environments. The development management tool 112 manages development environment configurations, increasing data scientist productivity. The configurations can include configuration of shared folders between developers, configuration of file permissions, host name management of virtual machines, network configuration setup and user identification management, and port management for intercommunicating with remote computing systems. The developer management tool 112, for example, functions to provide a fully self-contained environment identically replicated across all developer systems (e.g., guest operating systems), such that developer applications utilize a common tool set and development environment, ensuring developers' code bases will be intraoperative with each other and with the greater testing and application launching environment. The developer management tool 112 may interact with other software tools to establish the virtual environment.

Using the developer management tool 112, for example, the data science developer 104 can invoke an application programming interface (API) and launch an instance of a multiple guest operating system (OS) on the host operating system (host OS). The developer management tool 112 may launch a virtual machine management tool 114 which creates the virtual machine environment on the computing device installed with the operating system platform 110.

The virtual machine management tool 114, for example, may include a hypervisor capable of interoperating with the native operating system of the developer's computing platform. The virtual machine management tool 114 may be configured to create and manage the virtual machine 108 upon the developer's host computing device. The host device, for example, may host multiple guest virtual machines, where each user can function independently within its own VM environment 108 without awareness of the other guest virtual machines constructed upon the same host operating system 110.

The virtual machine management tool 114 may utilize software-based virtualization to reconfigure the guest operating system code, avoiding conflict with other guest VM environments. Additionally, the virtual machine management tool 114 may enforce hardware virtualization, for example where each guest VM 108 operating system executes in a different address space upon the underlying hardware. In another example, the virtual machine management tool 114 can emulate physical storage devices (e.g., virtual disks) for use by the guest virtual machine 108 OS in reading and writing data.

The virtual machine management tool 114 may further manage communications with remote computing devices and resources through port virtualization. For example, the virtual machine management tool 114 may emulate network card ports, USB controllers, and other interfaces allowing the guest user to reach external hardware and/or networked computing systems.

Upon logging into the VM environment, the developer 104 checks out a base project template from a version control system 116. The version control system 116, for example, may be maintained in the cloud analytics environment. The base project template provides the scaffolding for the developer's applications, including certain files residing in a certain directory structure, such that application code 118 and automated test algorithms 120 are stored in separate, designated spaces within storage 122.

The base project template, accessed from the version control system, includes a set of application dependencies 124 (e.g., standardized development libraries). The application dependencies 124 include a number of tools useful to developers in designing new data analytics algorithms. The application dependencies 124, in some examples, may include one or more of the following: Python™ libraries by the Python Software Foundation of Delaware, libraries for Machine Learning (e.g., Scikit-learn by David Cournapeau, NumPy Python™ extension, pandas by Wes KcKinney, etc.), Boto by Python™ (the AWS software development kit (SDK)), Flask by Armin Ronacher (micro web framework, useful in creating web service endpoints), and Redis data structure server by Salvatore Sanfilippo (useful, for example, in connecting to a highly performant in-memory key value store). The application dependencies 124, for example, may be selected by a software development team based upon the nature of the analytics development.

The base project template is used to define a software container 126 including application code 118 and application dependencies 124. The software container 126, for example, may include information used to launch a software image 144 including the application code 118 wrapped with a dependent runtime, as well as the application dependencies 124, for full execution portability. In one example, the base project template includes a template script for configuring the application dependencies. The developer 104 may rely upon the standard template script, or the developer 104 may amend the template script to customize template configuration (e.g. include a modified set of application dependencies 124). For example, a development team may modify a generic template script to create a template script applicable to the particular analytics scope of the development team.

The base project template may include a service composition tool for enabling container services. For example, the service composition tool may be used to configure services which are exposed by the container. In this manner, the developer 104 may create multiple interoperating software containers for execution within the cloud analytics environment.

Through the service composition tool, the analytics developer 104 may define services that make up the application so that the services can be run together in an isolated environment. Service dependencies, such as databases, queues, caches, and web service APIs, may be configured through a service composition file, for example. One or more containers may rely upon each service dependency.

The service composition tool, additionally, may provide a manner for destroying isolated testing environments released within the cloud analytics ecosystem. For example, the full test suite environment may be destroyed using a few commands entered through the service composition tool.

Further, volume data generated by a previously executed container, through the service composition tool, may be maintained upon launching a new container. The service composition tool, for example, may enable copying of volume data between an old container and a new container.

Additionally, the service composition tool may provide the ability to cache and re-use containers rather than recreating the container, providing the opportunity to make changes to the environment and re-launch testing rapidly.

While developing application code within the base project template, the developer 104 manages version and source control through the version control system 116. The version control system 116, for example, may maintain complete software container copies including, for example, the application code 118, tests 120, and application dependencies 124.

The version control system 116 may include a distributed, scalable version control system allowing developers to collaborate with team members through file sharing. The version control system, for example, may include intercommunication features, supporting sharing of information between development team members. The intercommunication features, in one example, include pull requests for facilitating code reviews within a development team. The version control system 116 may also support code branch permissions, such that portions of the development environment 100 (e.g., application code 118 and/or tests 120) may have varying permissions applied, blocking team members from altering some sections while allowing team members to alter other sections of the development conducted within the developer workspace 106. Further, the version control system 116 may include an inline discussion feature, providing team members the ability to log comments directly into the code interface in a manner similar to social media discussions.

The version control system 116 may provide the opportunity manage very large files, such as test data sets for including within the data analytics microservice to combine with data accessible via the cloud environment without releasing the test data sets within the data analytics ecosystem.

Upon completion of a development cycle, the developer 104 pushes the software container 126 to a build management system 128 for deployment and execution of the application code 118 and tests 120 as a software container image.

The build management system 128 builds the software containers and the tests 120 are automatically run on the software image to confirm the integrity of the build.

At the build management system 128, the software container is first built into a container image. If the build fails, the software developer 104 may be notified of errors so that code changes may be applied. The build, in some instances, may be performed in parallel using dependencies between software containers (e.g., where the developer 104 used the service composition tool to create dependencies between two or more software containers). The build, for example, may be managed using a build template including configuration settings, such as dependencies configuration settings. The developer 104 may edit the build template within the developer workspace 106. The build template, for example, may be maintained by the version control system 116.

In the circumstance that a portion of the applications 118 and dependencies 124 within the software container 126 were previously built (e.g., from a former version of the software container 126 or a former failed build which partially succeeded), the build management system 128 may merge the previously built components with the newly built components, saving time and resources. The build management system 128, for example, may identify changes based upon version control supplied by the version management system 116.

The build management system 128 may then run one or more tests against the container 126. The build management system 128, for example, may access application tests 120 from the version control system 116 for testing the software container 126. If the software container 126 was developed to function in tandem with additional software containers, the build management system 128 may execute one or more tests 120 against the software container suite.

Results of the tests, in some implementations, are provided to the developer 104 via an interface presented through the developer workspace 106. In the event of failure of one or more tests, for example, the build management system 128 may pend revisions and conduct at least a partial re-build of the software container 126. In another example, the build management system 128 may message the developer 104 regarding failure of one or more tests, for example via an email notification, text message, or messenger application.

In some implementations, the build management system 128 may analyze test coverage of the one or more tests 120. For example, the build management system 128 may identify portions of the code which were not executed by any of the tests 120, and a total percentage of code exercised during testing. This provides the developer 104 with the opportunity to include additional tests 120 to confirm functionality of all aspects of the software container 126 prior to deployment.

The build management system 128 may also monitor memory usage during testing, for example to identify any memory leaks or accidental memory overwrites performed by the software container code.

The build management system 128, in some implementations, automatically deploys the software container 126 to a build agent 130 for performing some aspects of the software container validation. The build agent 130, for example, may be installed for interaction with the build management system 128 to test the software container 126 against a customized build configuration. To rapidly build and test software containers, individual containers (or related container suites) may be delegated to a particular build agent 130 of a number of build agents managed by the build management system 128. The build management system 128, for example, may be configured to run build agents 130 emulating multiple operation system environments and/or environments including differing resources (e.g., hardware interfaces, network communication interfaces, external output devices, etc.). Using multiple build agents 130, for example, may confirm portability of the software container 126.

The build management system 128 may have scalable throughput by increasing the number of available build agents 130 depending upon the number of software containers released to the container deployment pipeline. For example, cloud resources may be allocated to additional build agents 130 as necessary to build and test a number of software containers released in rapid succession.

Because a software container is a self-contained "black box", there is a concern that the container could include malicious or otherwise undesirable contents. The build management system 128 may include a scanning module 132 for scanning the software container contents to identify any malware or other security vulnerabilities. The malware, for example, may be included in a software container either due to the developer 104 having an infected system or due to an internal bad actor (e.g., a developer maliciously including malware within the software container). The scanning module 132, for example, may include a collection of prohibited components which cause rejection of the software container 126 if discovered.

Additionally, the build management system 128 may analyze software components for algorithms which may produce performance concerns (e.g., processing-intensive scalable functionality, etc.). The build management system 128 may reject a software container due to identifying a security concern. The build management system 128 may further supply a report to the developer 104 detailing the identified security concern(s). The report, in some examples, may be provided to a user interface of the developer workspace 106 or issued via email.

In a further example, the build management system 128 may analyze the software components within the software container 126 for any out-of-date components. For example, some components designed to support interoperability between software containers, or interoperability between the software container 126 and external components of the analytics ecosystem such as the analytics data store, may include version control such that the build management system 128 ensures outdated components are flagged for the developer 104.

Figure 1B:
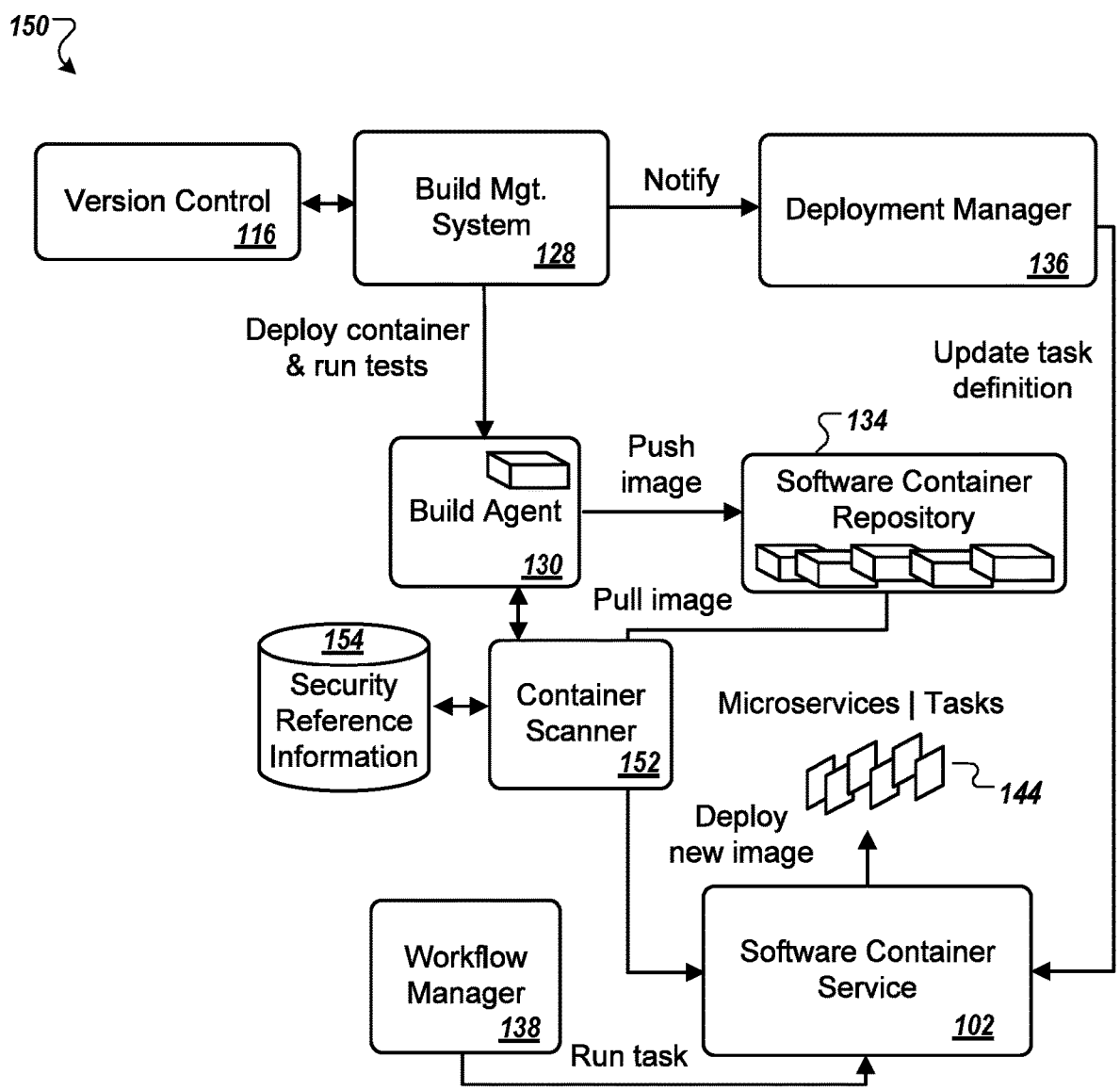
FIG. 1B is a block diagram of a portion of the example development ecosystem of FIG. 1A, including example container scanning security mechanisms.

In some implementations, to ensure security of containers both at time of build and at time of deployment, a container scanner service 152 is included in the development ecosystem 100. Turning to FIG. 1B, an example embodiment of a portion 150 of the example development ecosystem 100 of FIG. 1A includes the container scanner service 152 positioned to communicate with both the build management system 128 and/or build agent 130 and the software container service 102. The container scanner service 152, in some embodiments, reviews containers prior to build, storage to the software container repository, and/or deployment to the analytics ecosystem via the software container service 102 to identify any security concerns within the software container. The container scanner 152 may access security reference information 154 to obtain, in some examples, virus definitions, malware definitions, and/or identification of libraries retired due to security leak concerns.

In some implementations, the container scanner 152 reviews pre-compiled application code 118 to identify any viruses and/or malware. Further, the container scanner 152 may review application dependencies 124 to identify out of date libraries. For example, the container scanner 152 may obtain the software container from the build management system 128, build agent 130, and/or version control system 116 to review the pre-compiled contents of the software container.

In some implementations, the container scanner 152 scans the container image, after building, to identify signatures indicative of a virus or malware. For example, the container scanner 152 may obtain the container image from the build management system 128 and/or the build agent 130.

Further, in some implementations, the container scanner 152 is configured to scan container images pulled from the software container repository 134 prior to deployment by the software container service 102. In the event that the container scanner 152 is configured to scan the pre-compiled software container, the container scanner 152 may be provided access information for accessing the pre-compiled code corresponding to the container image from the version control system 116. In one example, the software container repository 134 may include information linking the container image to its version controlled source code such that the container scanner 152 can identify the relevant source code based upon identification of the container image in the software container repository 134. In another example, a separate utility, such as the workflow manager 138 or deployment manager 136, may supply information for accessing the pre-compiled code corresponding to the container image from the version control system 116.

If the container scanner 152 identifies one or more security concerns with the software container and/or container image, in some embodiments, the container scanner 152 provides an error message to the calling utility (e.g., build management system 128, build agent 130, and/or software container service 102), triggering halt of the build, storage, or deployment, as appropriate. For example, the container scanner 152 may issue an error code which is populated back through the system to the developer 104 for further handling. For example, the developer 104 may receive an email message, text message, and/or alert within a development dashboard environment indicating one or more security problems in the software container or container image.

In some implementations, the container scanner 152 works with the build management system 128 and/or build agent 130 to repair the faulty container or container image. For example, the container scanner 152 may identify a replacement library for linking with the software container application code in creating a replacement container image. Further, the container scanner 152 may identify a patch to correct faulty application code, such as shared utility code used within development teams coding within an object-oriented programming construct. Information regarding replacement libraries and/or replacement software utilities, in one example, may be accessed by the container scanner 152 from the security reference information 154. In another example, a section of the version control system 116 may be dedicated to identifying appropriate versioning for libraries and shared software utilities such that the container scanner 152 can identify an appropriate version from the version control system 116.

In some implementations, the container scanner 152 review privileges allotted to tasks within the container. In one example, the container scanner 152 may reject any container allocating root privileges. In another example, the container scanner 152 may determine that the allocated privileges are commensurate to the scope of the assigned tasks.

Further, in some implementations, the container scanner 152 reviews the container for any privileged or secure information that may be stored in an unsecure fashion. For example, the container scanner 152 may ensure that passwords, tokens, keys, and/or other confidential information are stored and managed securely such that the information may only be retrieved and/or decrypted by authorized users.

Returning to FIG. 1A, when the integrity of the software container build is established, the software container 126 is stored to a software container repository 134 pending deployment.

The software container repository 134 may expose access to the software container 126 via a secure socket layer (SSL) connection. For example, the software container service 102 may have access to software containers staged in the software container repository 134 through a uniform resource locator (URL) pointing to individual software containers or the set of staged software containers. The software containers, for example, may be accessible to external services such as the software container service 102 via secure hypertext transfer protocol (HTTPS) connection. The software container repository 134 may instead or additionally be accessible through a registry API. The software container repository 134 may be configured with a registry name, a basic URL, an index, and a storage region.

The software container repository 134 may manage security of the software containers. The software container repository 134 can require authentication for access to software containers. For example, login information may be required to gain access to the software containers. Additionally, the software container repository 134 may encrypt the software containers pending deployment.

While the software container 126 is staged in the software container repository 134, the build management system 128, in some implementations, notifies a deployment manager 136 that a new software container is ready for deployment. The software container 126, for example, may be identified to the deployment manager 136 using an image ID.

The deployment manager 136, in some embodiments, automates software deployment securely to the cloud environment. The deployment manager 136 may include a secure web-based interface used to modify and execute deployments. To perform deployments, the deployment manager 136 may execute software agents on systems where the software images will be deployed. For example, the deployment manager 136 may maintain software agents on a number of cloud-based servers or virtual machines within the analytics cloud environment. The agents, for example, may pend upon the servers or virtual machines for jobs assigned by the deployment manager 136.

The deployment manager 136 may coordinate multiple deployment environments within the cloud analytics environment. For example, the deployment manager 136 may have certain agents (e.g., resources) dedicated to active data analytics activities, while another set of agents (e.g., resources) are dedicated to isolated data analytics microservices run in development mode by the analytics developers 104.

Other services and systems within the analytics cloud environment, such as the build management system 128, may communicate with the deployment manager 136 through an API. A REST API, for example, may enable user interface functionality. The user interface, for example, may supply details regarding active and historic deployments. Further, the user interface may provide the developer 104 with the ability to manually intervene with the deployment (e.g., pause midway through execution of a software container).

The deployment manager 136, in some embodiments, invokes a deployment cycle including a number of steps for preparing to launch the software container 126 in the cloud analytics environment. The deployment cycle includes alerting the software container service 102 that a new deployment is underway. The alerting step, in a particular example, is a customized mechanism configured to update a task definition 142 in the software container service 102. The task definition 142 specifies which containers are required for a task, including identification of the repository (e.g., the software container repository 134) and image ID. The task definition 142 may further include memory and CPU requirements, shared data volumes, and/or relationships between containers within a container suite. Responsive to receiving the alert from the deployment manager 136 (e.g., upon recognizing the new task definition), the software container service 102 pulls new software container(s) from the software container repository 134.

The software container service 102, in some implementations, deploys new software executable images defined by the staged software containers in the software container repository 134. For example, upon identifying that the task definition 142 is out of date, the software container service 102 may retrieve a new container(s) from the software container repository 134 and deploy the images to a cloud computing cluster of the cloud analytics environment identified by the deployment manager 136 as the allocated computing resources.

The software container service 102, in some embodiments, manages a cluster of instances spawned from a number of software images staged to the software container repository 134. The instances, in some examples, include both hosting microservices (e.g. a machine learning algorithm behind a web service) and individual tasks developed for contributing to the functionality of a wider job (e.g. a piece of Extract, Transform, Load (ETL) logic for extracting data resources).

Figure 1C:
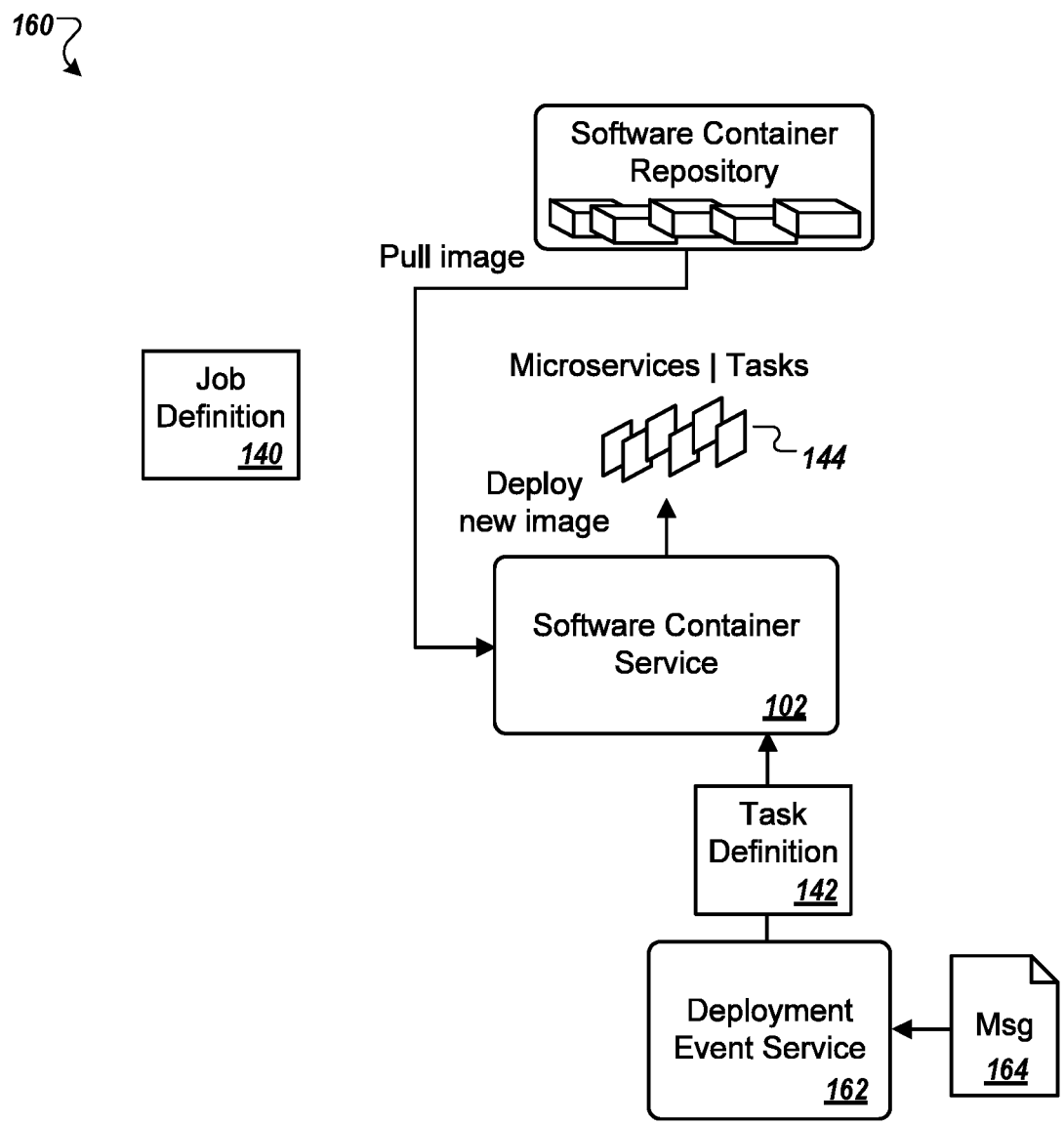
FIG. 1C is a block diagram of a portion of the example development ecosystem of FIG. 1A, including an example automated deployment trigger mechanism.

In some embodiments, rather than triggering release via the developer workspace 106, a deployment event service 162 may be used to automatically trigger deployment of a container image or job involving a container cluster. In this manner, for example, the pipeline illustrated in FIG. 1A may be extended to manage recurring analytics tasks in addition to data analytics development test runs. Turning to FIG. 1C, an extension 160 of a portion of the development ecosystem 100 includes the deployment event service 162 for managing schedule deployment events.

The deployment event service 162, in some implementations, receives a message 164 including details for triggering a container-based task. For example, the message 164 may be a file having a prefix designated to trigger deployment of a predefined task (e.g., defined in the task definition 142). In some embodiments, the deployment event service 162 matches the file prefix with the task definition 142 and supplies the task definition 142 to the software container service 102, thus triggering deployment of one or more software container images designated in the task definition 142. If management by the workflow manager 138 is desired, in some embodiments, an API call may be generated to the workflow manager 138. In another embodiment, information generated by the deployed software container image(s) may be persisted to a topic subscribed to by the workflow manager 138.

In some implementations, the message 164 contains initialization settings for launching the software container image or cluster images. For example, a file may be uploaded including a set of entity names, and the container image or image cluster may be designed to perform a web crawl to match entity names with additional entity information, such as address, subsidiaries, parent entity, and/or financial information. In another example, the file may include identification of a single entity by name and/or by entity features (e.g., size, geographic location, industry, age, etc.). Further to this example, the container image or image cluster may be designed to review an entity (e.g., client) database to identify most similar entities to the identified entity. In other words, the container image or image cluster may be developed to match a particular entity with its peers within the analytics ecosystem.

In some implementations, an error condition causes the software container service 102 to fail to deploy the requested task. For example, the container images identified in the task definition 142 may not be located in the software container repository 134. In another example, the workflow manager 138 may lack resources for performing the task (e.g., cloud service failure). In another example, the container scanner 152 of FIG. 1B may be combined with the event trigger mechanism capabilities of FIG. 1C. In the event of failure, build failure results may be perpetuated to a task log for review or distribution. For example, failure indications may be distributed one or more queues monitored by the workflow manager 138. Upon receiving build failure results, alerts and failure management may be allocated accordingly.

Returning to FIG. 1A, the software container service 102 may provide security management solutions for managing security of the cluster of instances. For example, task-based, cluster-based, and/or instance-based security roles may be allocated via the software container service 102.

The software container service 102, in some implementations, is designed to provide a user interface, via API calls, for launching and ceasing software container execution. The software container service 102, for example, may provide an interface for the developer 104 to query detailed information regarding the state of a cluster of instances. Further, the software container service 102 API-enabled user interface may support accessing security groups, load balancing, block storage volume management, and access and authentication management. In another example, the API-enabled user interface may provide information regarding CPU and memory utilization of executing tasks. The resource utilization statistics may be grouped by task definition, service, and/or cluster.

The software container service 102 may additionally log information regarding the performance of the executing instance clusters. The generated log files, for example, may be used to diagnose problems with the software container execution.

Although the software container service 102 would typically include a built-in instance scheduling service, a separate workflow manager 138, in some embodiments, supports wider job orchestration (e.g., including both the instances and active analytics requests) in the cloud analytics environment. The workflow manager 138, for example, may access a job definition 140 established by the analytics developer 104 for scheduling and managing the cluster instances. The job definition 140, for example, may be accessible to the workflow manager 138 via the version control system 116.

In some implementations, the workflow manager 138 coordinates microservices 144 to accomplish complex tasks or processes. For example, the workflow manager 138 may apply flow control constructs such as looping, branching, and scaling to coordinate the microservices 144 to perform an overall job identified in the job definition 140. The workflow manager 138 may further monitor execution of individual microservices 144 to track when to launch execution of a next phase of the flow processing. The job, in one example, may be considered to be a "serverless workflow".

The analytics developer 104 may have access, through a user interface supplied via the developer workspace, to a command line interface of the workflow manager 138 for testing, executing, backfilling, describing, and/or clearing portions of cluster instances. The analytics developer 104 may be provided the opportunity, for example, to schedule execution of the cluster instances.

The user interface, further, may include a dashboard interface for reviewing progress analytics, metadata, and/or logs associated with execution of the cluster instances. The metadata, for example, may describe job status and other persisted information. Progress monitoring may include analyzing where time is spent during execution of cluster instances, obtaining a comprehensive view of the speed at which the cluster instances complete various tasks, and correcting false positives/negatives in the logging of instance behavior.

Similar to the deployment manager 136, the workflow manager 138 may include agents executing on the individual computing devices allocated to the cluster instances in the analytics cloud environment. The workflow manager 138, for example, may coordinate and schedule activities of the workflow manager agents.

Figure 1D:
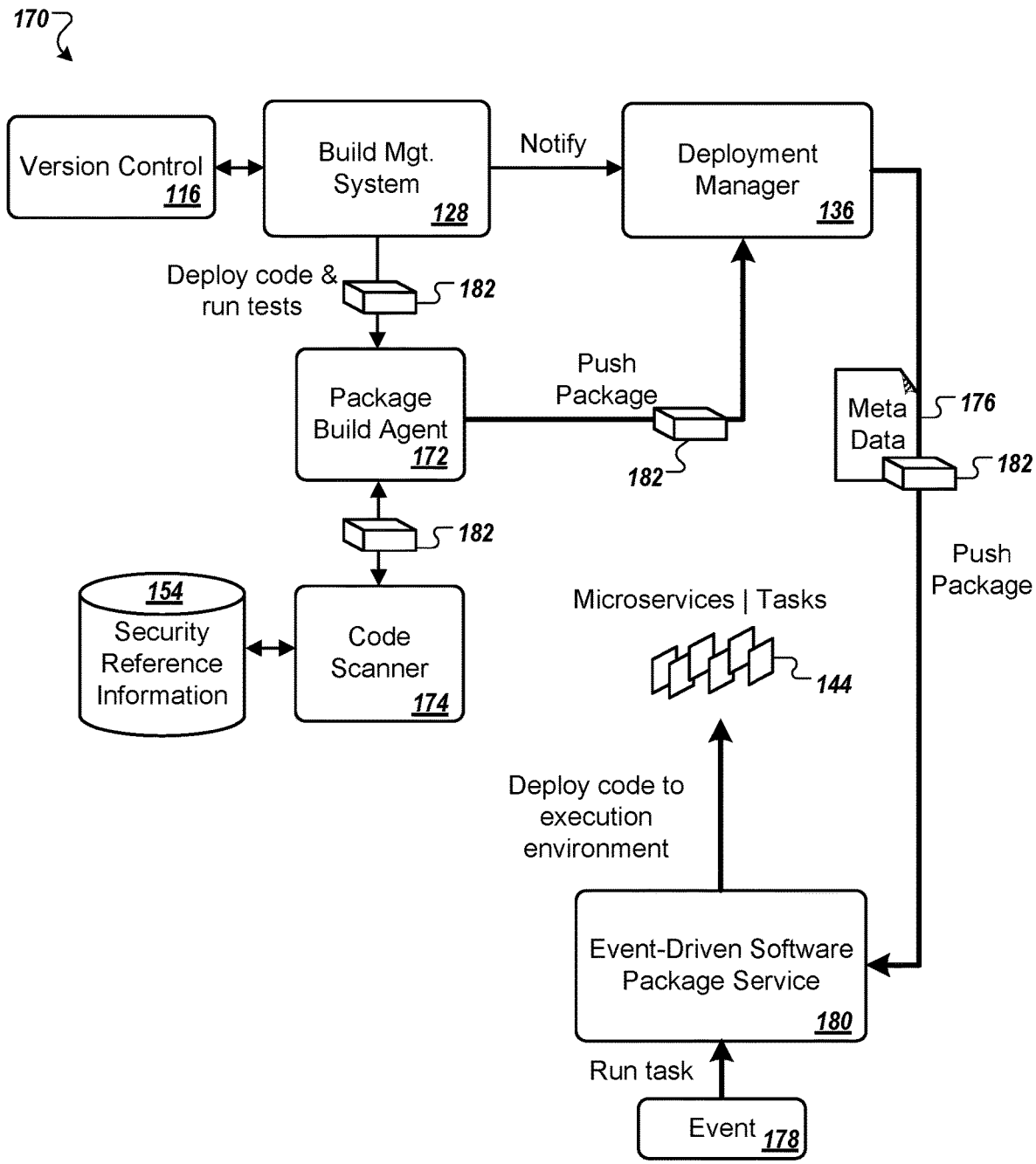
FIG. 1D is a block diagram of an alternative embodiment of a portion of the example development ecosystem of FIG. 1A, including an example event-driven deployment mechanism of a software code package into a function as a service execution environment.

In an alternative embodiment, turning to FIG. 1D, a partial operational flow 170 may support function-as-a-service execution of a data science experiment within a serverless execution environment. As illustrated in FIG. 1D, a portion of the development ecosystem of FIG. 1A may be replaced or expanded to include a package build agent 172 for packaging code for release within the execution environment, a code scanner 174 for applying security controls to the code prior to deployment, and an event-driven software package service 180 for releasing the packaged code to a Function as a Service (FaaS) environment. The FaaS environment, for example, may be provided by a cloud service provider, such as the Lambda serverless computing environment provided by the Amazon AWS cloud computing platform or Microsoft Azure Functions serverless computing environment provided by the Microsoft Azure cloud computing platform. The cloud service provider may launch the deployed packaged code as one or more microservices or tasks 144 within the serverless execution environment.

Further, the FaaS environment, in some embodiments, may provide scaling functionality to the deployed packaged code.

In some embodiments, the build management system 128 obtains software code from the version control system 116 and provides it to the package build agent 172. The build management system 128 may further notify the deployment manager 136 of the upcoming deployment of the code. This functionality may be substantially similar to the discussion above related to FIG. 1A. For example, rather than building a container image, the build management system 128 may build a code package 182 containing a code image. As with the container of FIG. 1A, the build may be managed using a build template including configuration settings, such as dependencies configuration settings. The developer 104 may edit the build template within the developer workspace 106. The build template, for example, may be maintained by the version control system 116. In other embodiments, the build management system 128 packages the code with runtime dependencies, such as one or more libraries.

Further, as described above, the build management system 128 may then run one or more tests against the code package 182, such as the application tests 120. Additionally, if the code was developed to function in tandem with additional software applications, the build management system 128 may execute one or more tests 120 against the software code suite.

The build management system 128, in some implementations, automatically deploys the software code package 182 to the package build agent 172 for performing some aspects of the software code package validation. The package build agent 172 may perform substantially similar operations to the build agent 130 of FIG. 1A. The package build agent 172, for example, may be installed for interaction with the build management system 128 to test the code package 182 against a customized build configuration.

The build management system 128 or package build agent 172, in some implementations, includes or interfaces with a code scanner 174, similar to the scanning module 132 of FIG. 1A and/or the container scanner 152 and security reference information 154 of FIG. 1B, for scanning the software package contents to identify any malware or other security vulnerabilities. The malware, for example, may be included in a software package either due to the developer 104 having an infected system or due to an internal bad actor (e.g., a developer maliciously including malware within the software package). The code scanner 174, for example, may include a collection of prohibited components which cause rejection of the software package 182 if discovered.

The package build agent 172, in some implementations, pushes the code package to the deployment manager 136 for deployment in the serverless execution environment. Unlike the functionality of the deployment manager 136 described in relation to FIG. 1A in reference to software containers, the deployment manager 136 may coordinate with the serverless computing environment for deployment of the code package 182 to the serverless execution environment. The cloud service provider, for example, may control the actual launch, management, and scaling of the tasks or microservices executing in the serverless computing environment without the localized control described in relation to FIG. 1A.

The deployment manager 136, in some embodiments, invokes a deployment cycle including a number of steps for preparing to load the code package 182 into the cloud analytics environment. The deployment cycle includes creating meta data 176 instructing the event-driven software package service 180 on parameters for software package loading. The meta data 176 may include, in some examples, memory requirements, processor requirements (e.g., CPU, GPU, number of cores or processors, etc.), networking configuration, and/or relationships between code packages within an application suite.

Responsive to receiving the code package 182 and meta data 176 from the deployment manager 136, the event-driven software package service 180 prepares for loading the code package 182 upon receipt of an event 178. The event 178, for example, may be received from the event service 162 of FIG. 1C. The event, in some examples, may be a scheduler-generated event, a file upload, or a message being placed on a queue. In some implementations, the event 178 includes information regarding the launch of the code package such as initialization settings. The initialization settings can information related to the launch of execution designed to provide meaningful input to the task or microservice to be run such as, in some examples, a particular virtual machine environment and/or data for initializing performance of the code (e.g., one or more variable settings, an identifier of a memory location for processing data, etc.). In illustration, in the case of a file upload, the event may include the location of the file (e.g., a file having data to be processed by the task or microservice). In another illustration, in the case of an event triggered by a scheduler, the event may include input(s) to the task or a pointer to the input(s).

In some implementations, the code package 182 is provided, by the event-driven software package service 180, to the serverless computing environment for deployment as a microservice or task 144.

As with the software container service 102 of FIG. 1A, in some embodiments, the event-driven software package service 180 manages a cluster of instances spawned from a number of software code packages. The instances, in some examples, include both hosting microservices (e.g. a machine learning algorithm behind a web service) and individual tasks developed for contributing to the functionality of a wider job (e.g. a piece of Extract, Transform, Load (ETL) logic for extracting data resources).

Figure 2:
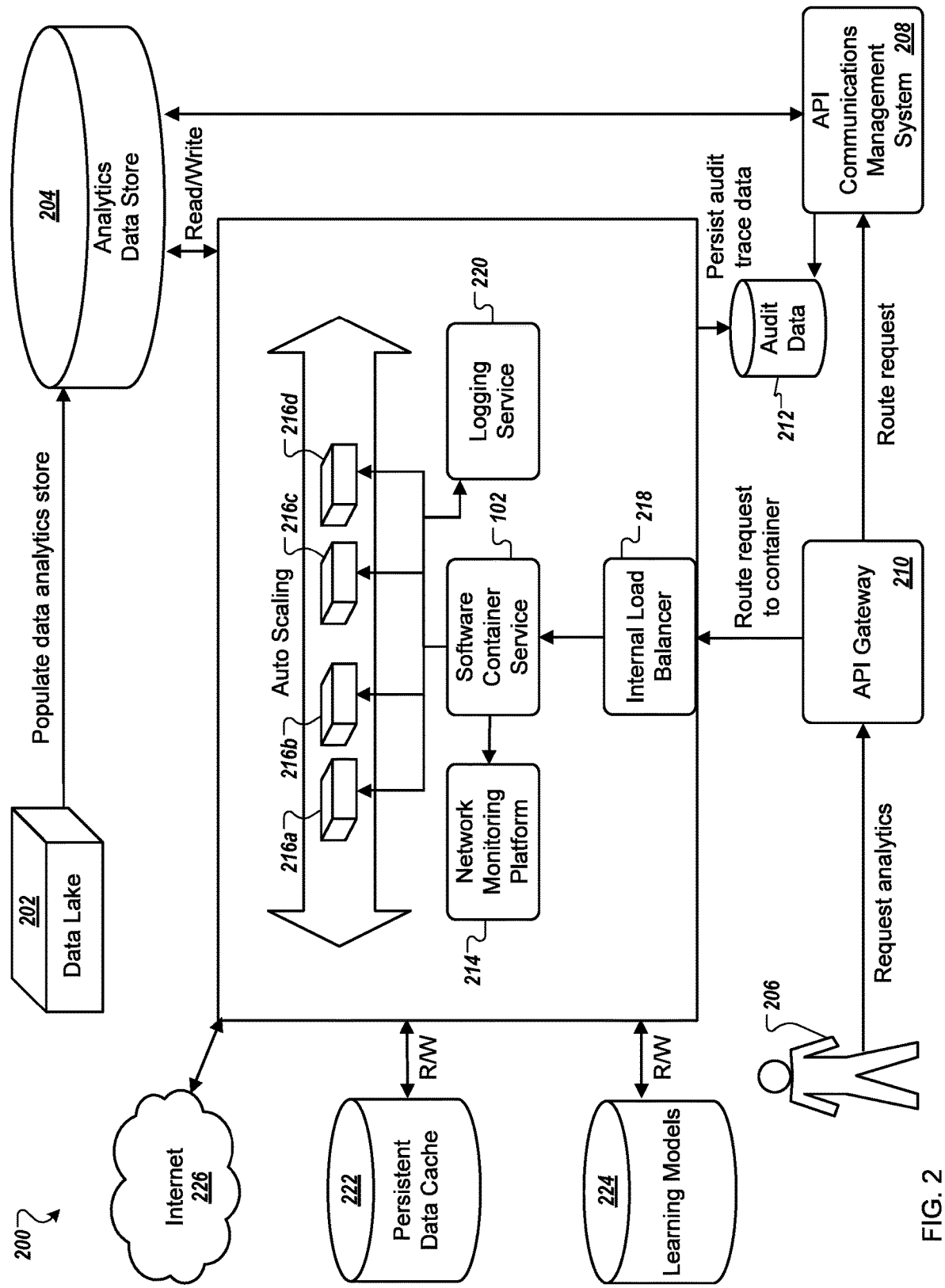
FIG. 2 is a block diagram of an example analytics ecosystem for executing analytics workloads.

Turning to FIG. 2, the software container service 102 of FIG. 1A or event-driven software package service 180 of FIG. 1D, in some implementations, is part of a wider deployment of both isolated experiments and active client analytics within an analytics ecosystem 200. Data entering the analytics ecosystem 200 may collect in a data lake 202. The data may be uploaded and/or imported into the data lake 202 from a number of resources, both internal and external. In some examples, the data in the data lake 202 may include reference data, public sources, client sources, transactional systems, as well as internal data and logs. The data in the data lake 202 may be processed through stages of transformation, enriched with reference data, validated and persisted into an analytics data store 204. The data structures available in the analytics data store 204, for example, may be accessed by users 206 through submitting requests which are routed to the software container service 102 of FIG. 1A or event-driven software package service 180 of FIG. 1D for staging and deployment to the analytics ecosystem.

The analytics developers 104 of FIG. 1A may also access the analytics ecosystem 200 to utilize the analytics data store 204 and, optionally, to blend the analytics data store 204 data with new sources of data from anywhere (e.g., network-accessible, remotely stored, etc.).

Results of the developers' analytics workloads can be scheduled to automatically refresh data marts which underpin web portals, serving up customized interactive dashboards and reports. For example, the results may be fed through an API communications management system 208 to an API gateway 210 to connect with a dashboard API interface. In another example, the results of analytics workloads may feed into downstream APIs (e.g., developed in separate software containers or software packages which are capable of intercommunication due to, for example, services exposed in additional software containers).

The analytics ecosystem 200 includes mechanisms for ensuring system robustness and data integrity including, in some examples, security, logging & auditability, backup & recovery, and/or process monitoring. For example, the analytics ecosystem 200 collects audit data 212 supplied by various components of the analytics ecosystem 200. The audit data 212 can include logging information supplied by the software container service 102, software package service 180 and/or workflow manager 138, as described in greater detail in relation to FIG. 1A and FIG. 1D.

The analytics ecosystem 200, in some implementations, includes a network monitoring platform 214 for traffic monitoring and management. The network monitoring platform 214, for example, can be used to tune instances based on observed traffic patterns. The network monitoring platform 214, for example, may include the workflow manager 138 job configuration and interactive command control management as described in relation to FIG. 1A.

The analytics ecosystem 200, in some embodiments, includes tag-driven automated shutdown of executing cluster instances. Using tagging and a bit of scripting, stops and starts can be automated, and misbehaving instances (e.g., exhibiting out of control replication, utilizing an unacceptable amount of resources, etc.) can be automatically disabled.

Dashboard interfaces for the analytics ecosystem 200 may be developed using a rapid web application development platform, allowing scripting which supplies interactive dynamic services to the end user 206. The rapid web application development platform, for example, may include cache management and streamlined database access to the data analytics store 204. Further, the rapid web application development platform may support client-side code generation of interactive dashboard features (e.g., widgets) and user validation.

The rapid web application development platform, further, may include server clustering and task scheduling mechanisms to speed up operation of the dashboard GUI interface supplied to client systems. Tasks, for example, may be managed and scheduled by the rapid web application development platform to ensure real time response to analytics requests submitted by users 206 via the API gateway 210.

The rapid web application development platform may utilize object oriented (OO) coding mechanisms for reuse of modular functionality and inheritance between dashboard functionalities, allowing a dashboard developer to build upon preexisting dashboard widgets, controls, and layouts when adding new functionality to the end user dashboard interface.

The API communications management system 208, for example, may be provided as part of the rapid web application development platform, allowing security and scalability of interactive dynamic dashboard features and fast access to information. For example, the API communications management system 208 portion of the rapid web application development platform may perform access control, restricting API access to trusted users 206 of the analytics ecosystem 200. For example, the API communications management system 208 may restrict access to certain types of data or analytics to certain types of users 206.

The API communications management system 208 may develop logs or other analytics regarding API usage (e.g., across applications, methods, users, etc.). Additionally, the API communications management system 208 may provide separate portals based upon user level. In one example, individual portals may be provided for administrator, publisher, subscriber, and developer users 206.

Instances within the analytics ecosystem 200, in some implementations, are deployed to a parallel stack to ensure deployment across several servers. For example, arrival of a new request from the user 206 may trigger an auto-scaling event in the cloud analytics ecosystem 200, where at least 1 and up to 10 servers are allocated, bootstrapped with the code that knows how to pull the data in from the data lake 202 and/or analytics data store 204, and persist for processing of the analytics request. At the end of processing, the allocated servers may be automatically scaled back to zero pending a next request. In one example, the deployment manager 136 of FIG. 1A manages at least a portion of the auto-scaling through provision of agents 216 which manage added cloud computing resources. In another example, the workflow manager 138 of FIG. 1A may auto-scale resources based upon the configuration parameters and current behaviors of executing instances (e.g., allocating additional resources to meet configuration requirements for execution of the job).

In some implementations, an internal load balancer 218 manages load balancing of microservices, tasks, and/or container instances across allocated servers. Upon loss of an allocated server, for example, the internal load balancer 218 may redirect the instance to another server for continuing execution. Further, the internal load balancer 218 may monitor speed, resources, and and/or response time of each allocated server to intelligently distribute instances across the allocated servers for processing. In another example, the internal load balancer 218 may consider allocation of instance clusters (e.g., two or more container images or software package instances which include dependencies such that execution of the instance cluster must occur within a dedicated space for fast information sharing) in appropriately distributing processing loads across allocated servers.

Externally-facing APIs can be costly to run, as you are waiting for consumer take-up. It is not practical to auto-scale for externally-facing APIs if traffic is occasional. In some embodiments, the API gateway 210 allows a serverless, "contract-first" approach to API development. Using the API communications management system 208, API communications are managed without a persistent API interface. When information is ready for transfer, for example, the API communications management system 208 may coordinate re-establishment of a communications link with a client (e.g., user 206) on the other side of the API gateway 210.

Figure 3:
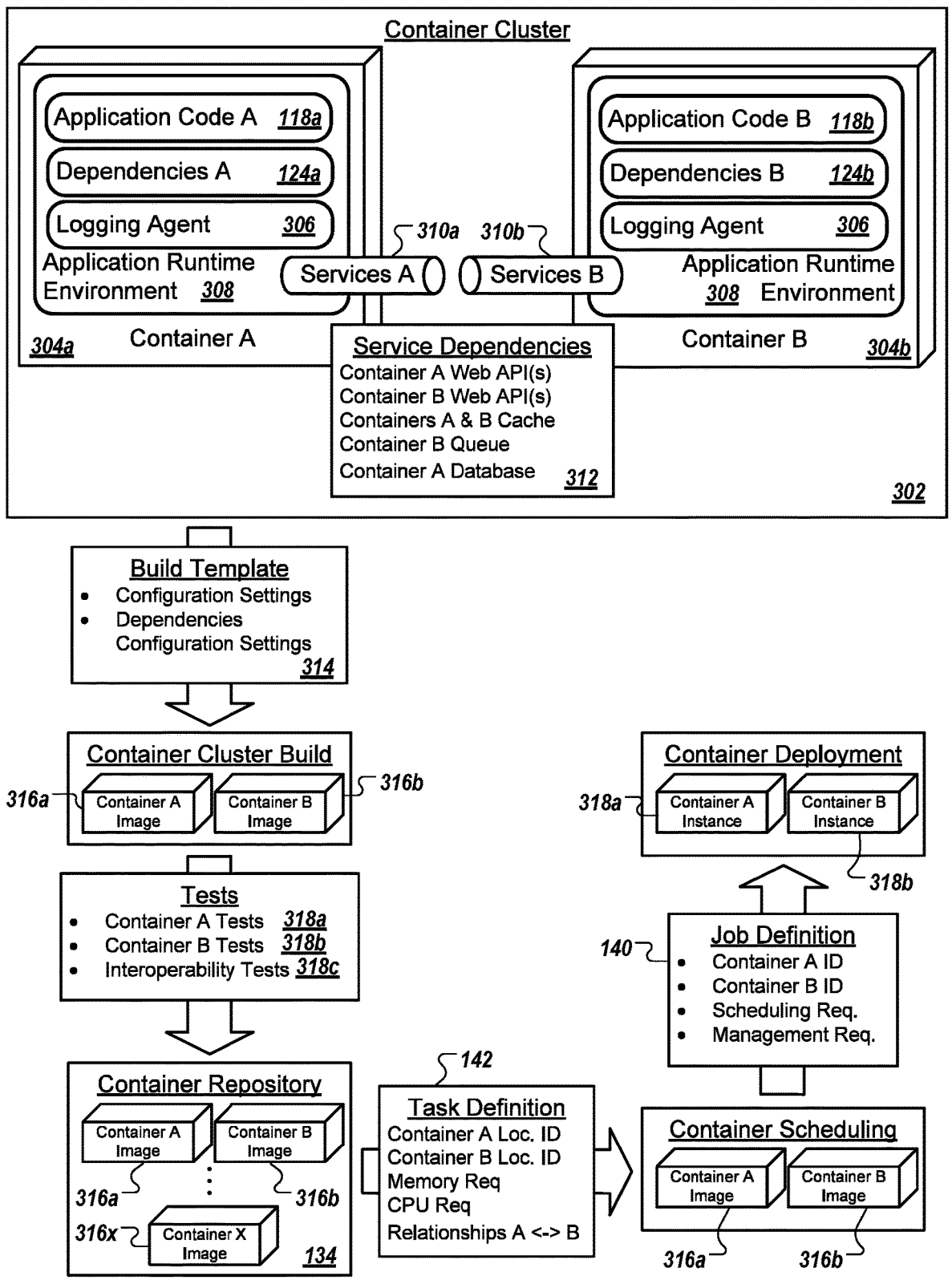
FIG. 3 is a flow diagram of handling of an example software container through a deployment pipeline.

Turning to FIG. 3, a flow diagram illustrates an example flow 300 for moving a container cluster 302 through a container pipeline such as the pipeline illustrated in FIG. 1A or FIG. 1B. As illustrated, the container cluster 302 includes a first container A 304a and a second container B 304b. However, any number of containers 304 may be included in the container cluster 302. Each of the containers 304 includes its individual application code 118a,b and dependencies 124a, b, as described in relation to FIG. 1A. Further, each container 304a,b includes a logging agent 306 to enable logging of performance statistics and error conditions during the execution of the container 304a,b within the analytics ecosystem. An application runtime environment 308 is baked into each of the containers 304a,b to provide a support structure for the execution of the application code 118a, 118*b*. Services 310*a*,310*b* allow for intercommunication between containers 304*a*,304*b* of the container cluster 302, as well as for any additional external communications.

In some implementations, communications between the containers 304*a*, 304*b* of the container cluster 302 and performance coordination is enabled in part by service dependencies 312. The service dependencies 312, for example, may be established by the developer 104 of FIG. 1A to identify any application programming interfaces, cache structures, queues, and/or databases used by one or more containers 304 in the container cluster 302. Upon deployment of the container cluster 302, execution of the application code 118*a* and application code 118*b* of the respective containers 304*a*, 304*b* can be coordinated in part via the service dependencies 312.

In some implementations, a build template 314 identifies configuration settings as well as dependencies configuration settings for reserving resources and allocating structures to enable the building of the containers 304*a*, 304*b* within the container cluster 302 into container images 316*a*, 316*b*. Using the build template 314, for example, the build management system 128 and/or build agent 130 of FIG. 1A may build each of the containers 304*a*, 304*b* into the container images 316*a*, 316*b*. The build template, for example, may be maintained by the version control system 116 or FIG. 1A.

Next, using the built container images 316*a*, 316*b*, in some implementations, tests 318 are performed on the executable code images of the built container images 316*a*, 316*b* to ensure functionality of the built container images 316*a*, 316*b*. For example, the tests 318 may include the tests 120 developed in the developer workspace 106 by the developer 104, as described in relation to FIG. 1A. In some embodiments, first each built container image 316*a*, 316*b* is tested using individual container tests 318*a*, 318*b* to ensure localized functionality, then interoperability tests 318*c* are performed to assure appropriate interoperability of the software containers 304*a,b* of the software container cluster 302. The build management system 128 of FIG. 1A, for example, may access application tests 120 from the version control system 116 for testing the software container 126.

In some implementations, upon building and testing the containers 304*a*, 304*b* of the container cluster 302, the container images 316*a*, 316*b* are maintained in a container repository such as the software container repository 134 described in relation to FIG. 1A.

In some implementations, the container cluster 302 is deployed by initiating execution of a task. The task definition 142, for example, may identify each container within the cluster as well as system requirements for executing the task. In some examples, the system requirements can include memory requirements, CPU requirements, environment variables, and/or networking details. Further, the task definition 142 may include relationships between the containers 304*a*, 304*b* within the container cluster 302. The deployment manager 136 of FIG. 1A, in some embodiments, updates the task definition 142 in the software container service 102 to initiate deployment. For example, the deployment manager 136 may inject environment properties into the task definition 142 which was generated as part of the build process. Updating of the task definition 142, for example, may be performed via a batch process which issues the task definition 142 on a scheduled basis to trigger deployment.

In some implementations, the software container images are designed to cooperate with a machine learning model and/or persistent cache containing data used in recurring data analytics tasks. Turning to FIG. 2, in some embodiments, the analytics ecosystem includes one or more learning models 224 for performing machine learning algorithms against data such as data maintained in the analytics data store 204 or information accessed via an Internet connection 226 (e.g., for web crawling, etc.). The persistent data cache 222, for example, may be used to maintain results that may otherwise need to be gleaned from the data store 204 or information accessed via the Internet connection. For example, web crawling results may be cached such that resources are not devoted to performing the same crawl again. The persistent data cache 222 information, for example, may expire after a period of time such that fresh results are gleaned from the data sources. Further, the learning models 224 may rely upon information captured in a persistent data cache 222 during iterative training. In a particular example, results of peer identification may be provided to an end user, and feedback related to the peer identification results may be provided to the analytics ecosystem 100 for adjusting the peer identification learning model.

Returning to FIG. 3, in some implementations, responsive to receiving the updated task definition, the container images 316*a*, 316*b* are scheduled for deployment. For example, as described in relation to FIG. 1A, the software container service 102 may schedule deployment of the task, including the container images 316*a*, 316*b* to the analytics ecosystem 200 of FIG. 2.

To deploy the container images 316*a*, 316*b*, in some embodiments, the job definition 140 is accessed to determine deployment requirements. For example, the workflow manager 138 may access the job definition 140 from the version control system 116. The job definition 140 may be drafted by the developer 104. In some examples, the job definition may include identification of each of the containers 304*a*, 304*b* within the container cluster 302 as well as scheduling requirements and management requirements. For example, the job definition 140 contains instructions for coordination of tasks, including relationships and dependencies established to maintain appropriate timing and to avoid error conditions. In a particular example, the job definition may describe workflows as directed acyclic graphs (DAGS) of tasks for scheduling and execution following specified relationships and dependencies. Using the job definition 140, container instances 318*a*, 318*b* of the container images 316*a*, 316*b* are deployed to the analytics ecosystem. For example, the internal load balancer 218 of FIG. 2 may allocate appropriate resources and designate server space for performance of the task represented by the task definition 142 through execution of the container instances 318*a*, 318*b*.

In some implementations, during execution of the container instances 318*a*, 318*b*, the logging agent interfaces with a logging service 220 (illustrated in FIG. 2) to log statistics and collect debugging/error information during execution of the container instances 318*a*, 318*b*. The logging service 220, in one example, may interface with audit data 212 to create a persistent audit trace of the performance of the container instances 318*a*, 318*b*. In another example, the logging service 220 may interface with a dashboard interface presented to the developer 104 to monitor progress of the task performance. For example, the logging service 220 may provide logging data to a designated dashboard tool for generation of performance analytics and presentation to the developer 104. In another example, the logging service 220 may supply a data stream for presentation at a developer console (e.g., including debugging messages).

Figure 4:
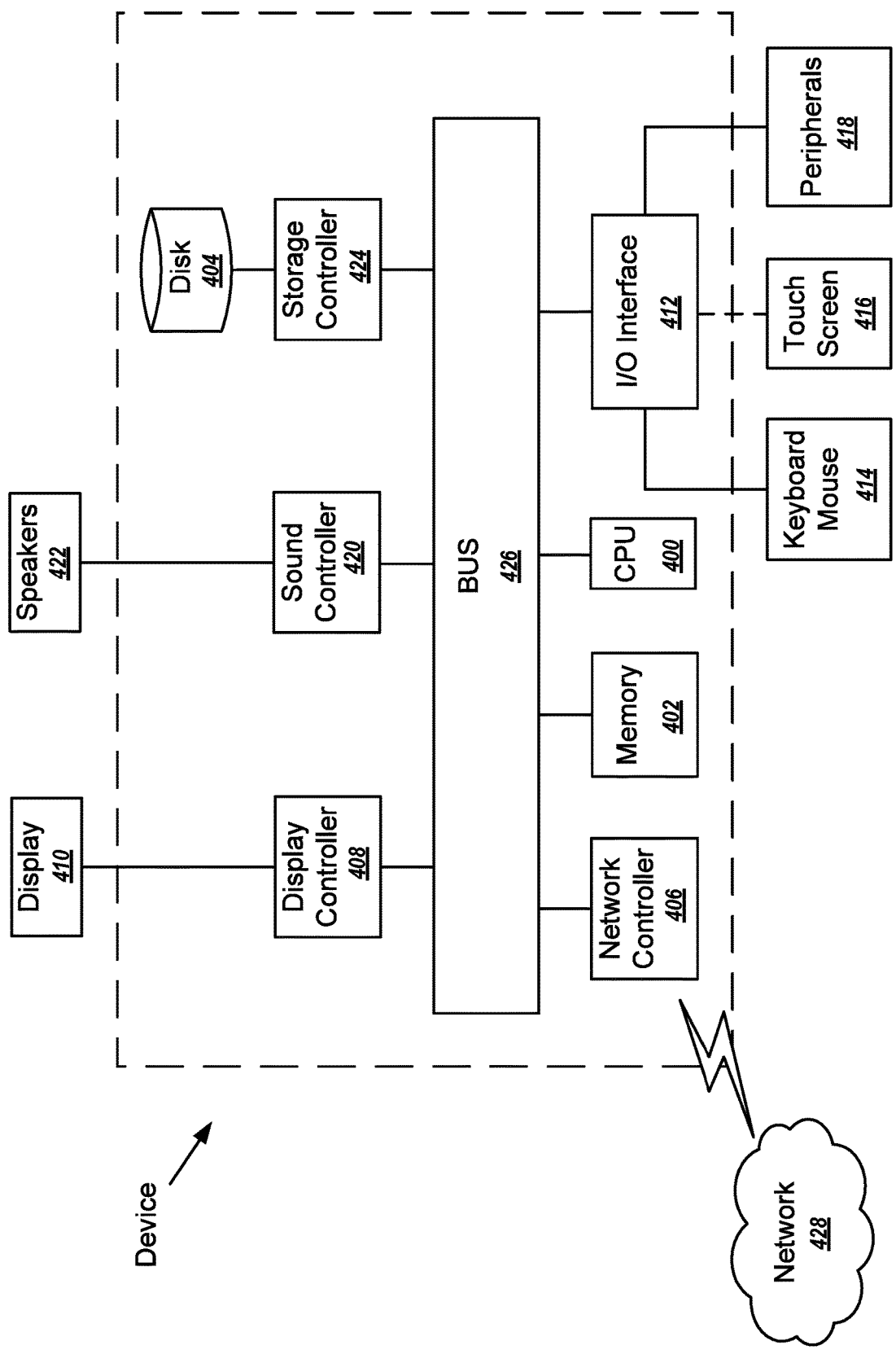
FIG. 4 is a block diagram of an example computing system.
Figure 5:
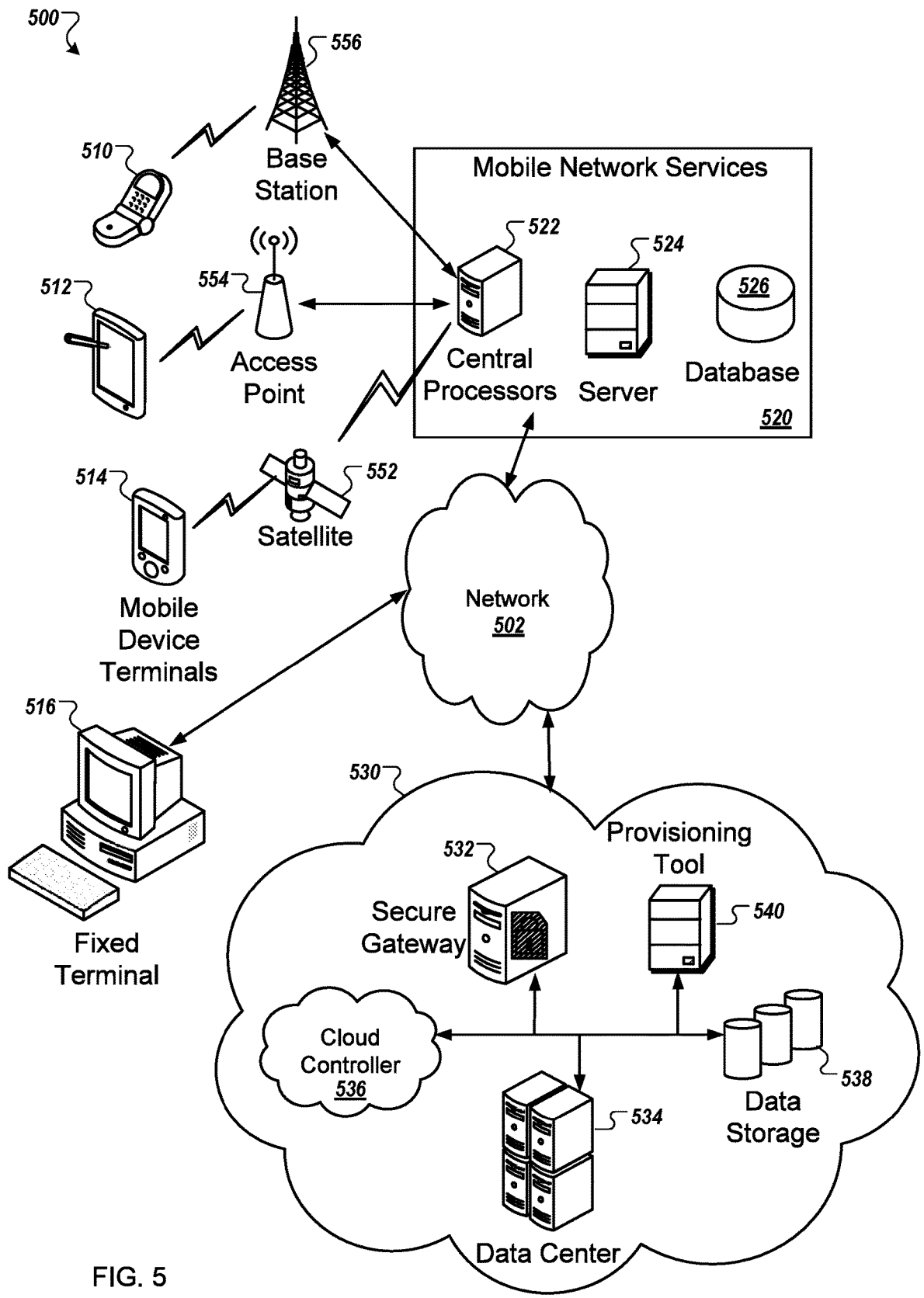
FIG. 5 is a block diagram of an example distributing computing environment including a cloud computing environment.

Next, a hardware description of the computing device, mobile computing device, or server according to exemplary embodiments is described with reference to FIG. 4. In FIG. 4, the computing device, mobile computing device, or server includes a CPU 400 which performs the processes described above. The computing device, for example, may be the developer device supporting the developer workspace 106. The process data and instructions may be stored in memory 402. These processes and instructions may also be stored on a storage medium disk 404 such as a hard drive (HDD) or portable storage medium or may be stored remotely. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computing device, mobile computing device, or server communicates, such as a server or computer.

Further, a portion of the claimed advancements may be provided as a utility application, background daemon, or component of an operating system, or combination thereof, executing in conjunction with CPU 400 and an operating system such as Microsoft Windows, Microsoft Windows Server, UNIX, Solaris, LINUX, Apple macOS, Google Android, Apple iOS, and other systems known to those skilled in the art.

CPU 400 may be a Xenon or Core processor from Intel of America or an Opteron processor from AMD of America, or may be other processor types that would be recognized by one of ordinary skill in the art. Alternatively, the CPU 400 may be implemented on an FPGA, ASIC, PLD or using discrete logic circuits, as one of ordinary skill in the art would recognize. Further, CPU 400 may be implemented as multiple processors cooperatively working in parallel to perform the instructions of the inventive processes described above. The CPU 400, for example, may execute processing supporting the developer workspace 106, version control system 116, build management system 128, scanning module 132, build agent 130, deployment manager 136, workflow manager 138, software container service 102, and/or software container repository 134 of FIG. 1A, the container scanner 152 of FIG. 1B and/or the deployment event service 162 of FIG. 1C, the package build agent 172, code scanner 174, and/or event-driven software package service 180 of FIG. 1D, the API gateway 210, the API communications management system 208, the internal load balancer 218, the network monitoring platform 214, and/or the logging service 220 of FIG. 2.

The computing device, mobile computing device, or server in FIG. 4 also includes a network controller 406, such as an Intel Ethernet PRO network interface card from Intel Corporation of America, for interfacing with network 428. As can be appreciated, the network 428 can be a public network, such as the Internet, or a private network such as an LAN or WAN network, or any combination thereof and can also include PSTN or ISDN sub-networks. The network 428 can also be wired, such as an Ethernet network, or can be wireless such as a cellular network including EDGE, 3G and 4G wireless cellular systems. The wireless network can also be Wi-Fi, Bluetooth, or any other wireless form of communication that is known. The network 428, for example, may connect the developer workspace 106 to the version control system 116, the software container service 102 and/or event-driven software package service 180 to the data analytics ecosystem 200, or the user 206 to the API Gateway. The network 428 can include the Internet 226 of FIG. 1B.

The computing device, mobile computing device, or server further includes a display controller 408, such as a NVIDIA GeForce GTX or Quadro graphics adaptor from NVIDIA Corporation of America for interfacing with display 410, such as a Hewlett Packard HPL2445w LCD monitor. A general purpose I/O interface 412 interfaces with a keyboard and/or mouse 414 as well as a touch screen panel 416 on or separate from display 410. General purpose I/O interface also connects to a variety of peripherals 418 including printers and scanners, such as an OfficeJet or DeskJet from Hewlett Packard.

A sound controller 420 is also provided in the computing device, mobile computing device, or server, such as Sound Blaster X-Fi Titanium from Creative, to interface with speakers/microphone 422 thereby providing sounds and/or music.

The general purpose storage controller 424 connects the storage medium disk 404 with communication bus 426, which may be an ISA, EISA, VESA, PCI, or similar, for interconnecting all of the components of the computing device, mobile computing device, or server. A description of the general features and functionality of the display 410, keyboard and/or mouse 414, as well as the display controller 408, storage controller 424, network controller 406, sound controller 420, and general purpose I/O interface 412 is omitted herein for brevity as these features are known. The storage medium disk 404, for example, may support storage of the development files 122 and/or the application dependencies 124 within the developer workspace 106. The security reference information 154 of FIG. 1B may be maintained by the storage medium disk 404. In some examples, the storage medium disk 404 may maintain the persistent data cache 222, the learning models 224, the audit data 212, the data lake 202, or the analytics data store 204 of FIG. 2.

One or more processors can be utilized to implement various functions and/or algorithms described herein, unless explicitly stated otherwise. Additionally, any functions and/or algorithms described herein, unless explicitly stated otherwise, can be performed upon one or more virtual processors, for example on one or more physical computing systems such as a computer farm or a cloud drive.

Reference has been made to flowchart illustrations and block diagrams of methods, systems and computer program products according to implementations of this disclosure. Aspects thereof are implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry, or based on the requirements of the intended back-up load to be powered.

The functions and features described herein may also be executed by various distributed components of a system. For example, one or more processors may execute these system functions, wherein the processors are distributed across multiple components communicating in a network. The distributed components may include one or more client and server machines, which may share processing, as shown on FIG. 3, in addition to various human interface and communication devices (e.g., display monitors, smart phones, tablets, personal digital assistants (PDAs)). The network may be a private network, such as a LAN or WAN, or may be a public network, such as the Internet. Input to the system may be received via direct user input and received remotely either in real-time or as a batch process. Additionally, some implementations may be performed on modules or hardware not identical to those described. Accordingly, other implementations are within the scope that may be claimed.

In some implementations, the processes and components described herein may interface with a cloud computing environment 530, such as Google Cloud Platform™ to perform at least portions of methods or algorithms detailed above. The processes associated with the methods described herein can be executed on a computation processor, such as the Google Compute Engine by data center 534. The data center 534, for example, can also include an application processor, such as the Google App Engine, that can be used as the interface with the systems described herein to receive data and output corresponding information. The cloud computing environment 530 may also include one or more databases 538 or other data storage, such as cloud storage and a query database. The databases 538, for example, can include the analytics data store 204 and the data lake 202 of FIG. 2. In some implementations, the cloud storage database 538, such as the Google Cloud Storage, may store processed and unprocessed data supplied by systems described herein. The data, for example, can include the persistent data cache 222 and the learning models 224 of FIG. 2. Additional cloud-based storage may be allocated for storing the files of the version control system 116 and/or the software container repository 134 of FIG. 1A.

The systems described herein may communicate with the cloud computing environment 530 through a secure gateway 532. In some implementations, the secure gateway 532 includes a database querying interface, such as the Google BigQuery platform. The gateway 532, for example, can include the API gateway 210 of FIG. 2.

The cloud computing environment 102 may include a provisioning tool 540 for resource management. The provisioning tool 540 may be connected to the computing devices of a data center 534 to facilitate the provision of computing resources of the data center 534. The provisioning tool 540 may receive a request for a computing resource via the secure gateway 532 or a cloud controller 536. The provisioning tool 540 may facilitate a connection to a particular computing device of the data center 534. The software container service 102, for example, may coordinate with the provisional tool 540 for allocating resources to deployed software container images within the data analytics ecosystem 150.

A network 502 represents one or more networks, such as the Internet, connecting the cloud environment 530 to a number of client devices such as, in some examples, a cellular telephone 510, a tablet computer 512, a mobile computing device 514, and a desktop computing device 516. The network 502 can also communicate via wireless networks using a variety of mobile network services 520 such as Wi-Fi, Bluetooth, cellular networks including EDGE, 5G and 4G wireless cellular systems, or any other wireless form of communication that is known. In some embodiments, the network 502 is agnostic to local interfaces and networks associated with the client devices to allow for integration of the local interfaces and networks configured to perform the processes described herein.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments. Further, it is intended that embodiments of the disclosed subject matter cover modifications and variations thereof.

It must be noted that, as used in the specification and the appended claims, the singular forms "a," "an," and "the" include plural referents unless the context expressly dictates otherwise. That is, unless expressly specified otherwise, as used herein the words "a," "an," "the," and the like carry the meaning of "one or more." Additionally, it is to be understood that terms such as "left," "right," "top," "bottom," "front," "rear," "side," "height," "length," "width," "upper," "lower," "interior," "exterior," "inner," "outer," and the like that may be used herein merely describe points of reference and do not necessarily limit embodiments of the present disclosure to any particular orientation or configuration. Furthermore, terms such as "first," "second," "third," etc., merely identify one of a number of portions, components, steps, operations, functions, and/or points of reference as disclosed herein, and likewise do not necessarily limit embodiments of the present disclosure to any particular configuration or orientation.

Furthermore, the terms "approximately," "about," "proximate," "minor variation," and similar terms generally refer to ranges that include the identified value within a margin of 20%, 10% or preferably 5% in certain embodiments, and any values therebetween.

All of the functionalities described in connection with one embodiment are intended to be applicable to the additional embodiments described below except where expressly stated or where the feature or function is incompatible with the additional embodiments. For example, where a given feature or function is expressly described in connection with one embodiment but not expressly mentioned in connection with an alternative embodiment, it should be understood that the inventors intend that that feature or function may be deployed, utilized or implemented in connection with the alternative embodiment unless the feature or function is incompatible with the alternative embodiment.

While certain embodiments have been described, these embodiments have been presented by way of example only, and are not intended to limit the scope of the present disclosures. Indeed, the novel methods, apparatuses and systems described herein can be embodied in a variety of other forms; furthermore, various omissions, substitutions and changes in the form of the methods, apparatuses and systems described herein can be made without departing from the spirit of the present disclosures. The accompanying claims and their equivalents are intended to cover such forms or modifications as would fall within the scope and spirit of the present disclosures.

What is claimed is:

1. A system for accelerating the development and distribution of data science workloads, the system comprising:
    a development environment comprising a plurality of computing systems that are isolated from directly deploying jobs to an active analytics environment, each system of the plurality of computing systems comprising
        a developer workspace comprising a set of basic application dependencies for sharing across multiple development projects created within a plurality of developer workspaces of the development environment, and
        a version control system in communication with the plurality of developer workspaces, the version control system for managing sharing of in-progress software projects between an originating developer workspace of the plurality of developer workspaces and at least one additional developer workspace of the plurality of developer workspaces; and
    a build and deployment process pipeline in communication with the version control system for automatically launching experiments produced in the plurality of developer workspaces and stored in the version control system as jobs executing upon the active analytics environment, the build and deployment process pipeline comprising
        a build management system for automatically coordinating a build procedure for a software experiment, the build procedure including
            receiving software code from the version control system,
            testing the software code, and
            building a deployment package of the software code,
        a deployment manager in communication with the build management system for automatically coordinating one or more deployment definitions for deploying the software code, and
        a software deployment service for deploying a software package in the active analytics environment, wherein
            the deployment manager provides the software deployment service with one or more deployment definitions for deploying the software code, the one or more deployment definitions comprising at least one of memory requirements, processor requirements, a networking configuration, one or more relationships between the software code and additional software code, or a shared data volume, and
            the software deployment service receives the deployment package, and launches the software code into the active analytics environment in accordance with the one or more definitions;
    wherein the active analytics environment hosts a plurality of analytics jobs on behalf of a plurality of clients, and wherein
        one or more software processes of the software code access analytics data from an analytics data store of the active analytics environment while remaining isolated from the plurality of analytics jobs.

2. The system of claim 1, wherein the building the deployment package comprises building a software container image.

3. The system of claim 1, wherein launching the software code into the active analytics environment comprises launching the software code to a serverless computing environment.

4. The system of claim 1, wherein coordinating the build management procedure comprises allocating a respective build agent to each code package of a plurality of deployment packages for deploying in the active analytics environment.

5. The system of claim 1, wherein:
    the software experiment comprises a plurality of deployment packages; and
    testing the software code comprises performing interoperability testing between the software code of each of at least a portion of the deployment packages.

6. The system of claim 5, wherein the software deployment service launches the software code into the active analytics environment in accordance with a job definition identifying one or more scheduling requirements between the plurality of deployment packages.

7. The system of claim 1, wherein the deployment package comprises at least a portion of the set of basic application dependencies.

8. The system of claim 1, wherein the software deployment service launches the software code into the active analytics environment responsive to receipt of an event trigger.

9. The system of claim 8, wherein the build and deployment process pipeline comprises a deployment event service for issuing the event trigger.

10. A method for accelerating the development and distribution of data science workloads to an active analytics environment, the method comprising:
    establishing, within a development environment comprising a plurality of developer computing devices that are isolated from directly deploying jobs to the active analytics environment, a plurality of developer workspaces, each developer workspace comprising a set of basic application dependencies for sharing across multiple development projects created within the plurality of developer workspaces of the development environment;
    coordinating, by a version control system within the development environment, collaboration between the plurality of developer workspaces by enabling sharing of in-progress development projects between an originating developer workspace of the plurality of developer workspaces and at least one additional developer workspace of the plurality of developer workspaces;
    receiving, by a build and deployment pipeline from a first developer workspace of the plurality of developer workspaces, instructions to release a development project comprising software code, wherein the build and deployment pipeline comprises a plurality of coordinated software modules executing on processing circuitry for automatically launching experiments produced in the plurality of developer workspaces and stored in the version control system as jobs executing upon the active analytics environment;

accessing, by the build and deployment processing pipeline, the software code from the version control system;

testing, by the build and deployment processing pipeline, the software code;

building, by the build and deployment processing pipeline, a deployment package of the software code;

identifying, by the build and deployment processing pipeline, one or more definitions for deploying the software code, the one or more definitions comprising at least one of memory requirements, processor requirements, a networking configuration, or a shared data volume; and launching, by the build and deployment processing pipeline, the software code into the active analytics environment in accordance with the one or more definitions;

wherein the active analytics environment hosts a plurality of analytics jobs on behalf of a plurality of clients, and wherein one or more software processes of the software code access analytics data from an analytics data store of the active analytics environment while remaining isolated from the plurality of analytics jobs.

11. The method of claim 10, wherein testing the software code comprises automatically executing a test code corresponding to the software code, wherein the test code is accessed by the build and deployment processing pipeline from the version control system.

12. The method of claim 10, wherein the software code is launched into the active analytics environment as at least one microservice.

13. The method of claim 10, further comprising scanning, by the build and deployment processing pipeline, the software code for security vulnerabilities.

14. The method of claim 13, wherein scanning the software code for security vulnerabilities comprises accessing a software container image from a repository and scanning the software container image.

15. The method of claim 10, wherein launching the software code comprises coordinating launching of the software code with other related software code in accordance with a job definition identifying one or more scheduling requirements between a plurality of deployment packages.

16. The method of claim 15, wherein coordinating launching comprises applying flow control constructs to coordinate launching of software code corresponding to at least a portion of the plurality of deployment packages.

17. The method of claim 15, wherein:

the software code of each deployment package of the plurality of deployment packages is launched as one or more tasks or microservices; and coordinating launching of the software code comprises monitoring execution of a given task or microservice after launch to determine when to launch a next task or microservice.

18. The method of claim 15, further comprising accessing, by the build and deployment processing pipeline, the job definition from the version control system.

19. The method of claim 10, wherein establishing the plurality of developer workspaces comprises accessing, from the version control system, a base project template comprising the set of basic application dependencies.

20. The method of claim 10, wherein each developer workspace of the plurality of developer workspaces presents a respective developer interfacing with a respective computing device of the plurality of computing devices with a consistent development interface and tool set for developing software code.

21. The method of claim 10, wherein launching the software code comprises launching an image of the software code comprising a dependent runtime for executing the software code independent of an underlying hardware and operating system of the data analytics environment.

* * * * *